US012101507B2

(12) United States Patent
Dore et al.

(10) Patent No.: US 12,101,507 B2
(45) Date of Patent: Sep. 24, 2024

(54) VOLUMETRIC VIDEO WITH AUXILIARY PATCHES

(71) Applicant: INTERDIGITAL CE PATENT HOLDINGS, SAS, Paris (FR)

(72) Inventors: Renaud Dore, Rennes (FR); Bertrand Chupeau, Rennes (FR); Franck Thudor, Rennes (FR); Julien Fleureau, Rennes (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 28 days.

(21) Appl. No.: 17/786,005

(22) PCT Filed: Dec. 17, 2020

(86) PCT No.: PCT/EP2020/086623
§ 371 (c)(1),
(2) Date: Jun. 16, 2022

(87) PCT Pub. No.: WO2021/122881
PCT Pub. Date: Jun. 24, 2021

(65) Prior Publication Data
US 2023/0042874 A1    Feb. 9, 2023

(30) Foreign Application Priority Data

Dec. 19, 2019    (EP) .................................... 19306697

(51) Int. Cl.
*H04N 19/597*    (2014.01)
*G06T 9/00*    (2006.01)
(Continued)

(52) U.S. Cl.
CPC ............. *H04N 19/597* (2014.11); *G06T 9/00* (2013.01); *G06T 15/08* (2013.01); *G06T 15/20* (2013.01);
(Continued)

(58) Field of Classification Search
CPC ............. H04N 19/597; H04N 21/2353; H04N 21/2662; H04N 21/816; H04N 19/70;
(Continued)

(56) References Cited

U.S. PATENT DOCUMENTS 11,523,135 B2 * 12/2022 Aflaki Beni ......... H04N 19/167
11,711,544 B2 *  7/2023 Tourapis .............. H04N 19/467
                                                            375/240.08
(Continued)

FOREIGN PATENT DOCUMENTS

EP    3349182 A1    7/2018
EP    3474562 A1    4/2019
(Continued)

OTHER PUBLICATIONS

Anonymous, "Information Technology—Coded Representation of Immersive Media—Part 5: Video-based Point Cloud Compression", International Organization for Standardization, ISO/IEC 23090-5:2018(E), 2018, 72 pages.
(Continued)

*Primary Examiner* — Motilewa Good-Johnson
(74) *Attorney, Agent, or Firm* — CONDO ROCCIA KOPTIW LLP

(57) ABSTRACT

Methods and devices for encoding and decoding data representative of a 3D scene are disclosed. A set of first patches is generated from a first MVD content acquired from a first region of the 3D scene. A patch is a part of one of the views of the MVD content. A set of second patches is generated from a second MVD content acquired from a second region of the 3D scene. An atlas packing first and second patches is generated and associated with metadata indicating, for a patch of the atlas, whether the patch is a first or a second patch At the decoding side, first patches are used for
(Continued)

rendering the viewport image and second patches are used for pre-processing or post-processing the viewport image.

22 Claims, 4 Drawing Sheets

(51) Int. Cl.
  *G06T 15/08* (2011.01)
  *G06T 15/20* (2011.01)
  *H04N 21/235* (2011.01)
  *H04N 21/2662* (2011.01)
  *H04N 21/81* (2011.01)

(52) U.S. Cl.
  CPC ..... *H04N 21/2353* (2013.01); *H04N 21/2662* (2013.01); *H04N 21/816* (2013.01)

(58) Field of Classification Search
  CPC .... H04N 19/46; H04N 21/23439; G06T 9/00; G06T 15/08; G06T 15/20; G06T 9/001
  See application file for complete search history.

(56) References Cited

U.S. PATENT DOCUMENTS

| | | | |
|---|---|---|---|
| 2019/0371051 A1* | 12/2019 | Dore | G06T 7/90 |
| 2020/0221114 A1* | 7/2020 | Castaneda | H04N 19/194 |
| 2020/0344493 A1* | 10/2020 | Fleureau | H04N 13/178 |
| 2021/0211723 A1* | 7/2021 | Wang | H04N 23/698 |
| 2021/0274147 A1* | 9/2021 | Fleureau | H04N 21/234 |
| 2021/0321072 A1* | 10/2021 | Oh | H04N 13/194 |
| 2021/0409670 A1* | 12/2021 | Oh | H04N 21/23614 |
| 2023/0134675 A1* | 5/2023 | Ilola | H04N 21/816 725/86 |
| 2023/0217006 A1* | 7/2023 | Chupeau | H04N 19/597 345/419 |

FOREIGN PATENT DOCUMENTS

| | | | | |
|---|---|---|---|---|
| GB | 2572996 A | | 10/2019 | |
| WO | WO-2018130491 A1 | * | 7/2018 | .......... G06T 17/00 |
| WO | WO-2019202207 A1 | * | 10/2019 | .......... G06T 15/04 |
| WO | WO-2019243663 A1 | * | 12/2019 | |
| WO | WO-2020071738 A1 | * | 4/2020 | .......... H04N 13/111 |
| WO | WO-2021191500 A1 | * | 9/2021 | .......... G06T 15/005 |
| WO | WO-2022231706 A9 | * | 9/2023 | .......... G06N 3/04 |

OTHER PUBLICATIONS

Dai et al., "Shape Completion using 3D-Encoder-Predictor CNNs and Shape Synthesis", Institute of Electrical and Electronics Engineers (IEEE), 2017 IEEE Conference on Computer Vision and Pattern Recognition (CVPR), Honolulu, Hawaii, USA, Jul. 21, 2017, 14 pages.

Salahieh et al., "Test Model for Immersive Video", International Organisation for Standardisation, ISO/IEC JTC 1/SC 29/WG 11, Coding of Moving Pictures and Audio, Document: N18470, Geneva, Switzerland, Mar. 2019, 27 pages.

Fleureau et al., "Description of Technicolor Intel response to MPEG-I 3DoF+ Call for Proposal", International Organisation for Standardisation, ISO/IEC JTC1/SC29/WG11, Coding of Moving Pictures and Audio, Document: MPEG2019/m47445, Geneva, Switzerland, Mar. 2019, 24 pages.

Anonymous, "Definition of MPEG-I Phase 2a and subphases", International Organization for Standardization, ISO/IEC JTC1/SC29/WG11, Coding of Moving Pictures and Audio, Document: N18970, Brussels, Belgium, Jan. 2020, 6 pages.

Boyce et al., "Working Draft 3 of Immersive Video", International Organization for Standardization, ISO/IEC JTC1/SC29/WG11, Coding of Moving Pictures and Audio, Document: MPEG2018/M18794, Geneva, Switzerland, Oct. 2019, 49 pages.

* cited by examiner

VOLUMETRIC VIDEO WITH AUXILIARY PATCHES

CROSS REFERENCE TO RELATED APPLICATIONS

This application is a U.S. National Stage Application under 35 U.S.C. 371 of International Patent Application No. PCT/EP2020/086623, filed Dec. 17, 2020, which is incorporated herein by reference in its entirety.

This application claims the benefit of European Patent Application No. 19306697.4, filed Dec. 19, 2019, which is incorporated herein by reference in its entirety.

TECHNICAL FIELD

The present principles generally relate to the domain of three-dimensional (3D) scene and volumetric video content. The present document is also understood in the context of the encoding, the formatting and the decoding of data representative of the texture and the geometry of a 3D scene for a rendering of volumetric content on end-user devices such as mobile devices or Head-Mounted Displays (HMD).

BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Recently there has been a growth of available large field-of-view content (up to 360°). Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π steradians, immersive, omnidirectional or large field of view for example.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. The content is created by the means of dedicated sensors allowing the simultaneous recording of color and depth of the scene of interest. The use of rig of color cameras combined with photogrammetry techniques is a way to perform such a recording, even if technical difficulties remain.

While 3DoF videos comprise a sequence of images resulting from the un-mapping of texture images (e.g. spherical images encoded according to latitude/longitude projection mapping or equirectangular projection mapping), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (aka. 3DoF+) restricts the user viewing space to a limited volume called viewing bounding box, allowing limited translation of the head and parallax experience. This second context is a valuable trade-off between free navigation and passive viewing conditions of a seated audience member.

In a 3DoF+ scenario, an approach consists in sending only the information needed to watch the 3D scene from any point of the viewing bounding box. Another approach considers sending additional geometry and/or color information, not visible from the viewing bounding box, but useful to perform other process at the decoder side like relighting, collision detection or haptic interactions. This additional information may be conveyed in the same format than visible points. However, there is a need for a format and methods to indicate to the decoder that a part of the information is to be used for rendering and another part of the information to be used for other processing.

SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate a method for encoding a data representative of a 3D scene in a data stream. The method comprises:
  generating a set of first patches from a first multi-view-plus-depth (MVD) content acquired for a rendering of the 3D scene. The first MVD is acquired from a first region of the 3D scene. A patch is a part of one of the views of the MVD content.
  generating a set of second patches from a second MVD content acquired for a pre-processing or a post-processing use; The second MVD is acquired from a second region of the 3D scene. The second region may overlap the first region or being separated.
  generating an atlas with first and second patches. An atlas is an image packing patches according to an atlas layout and is associated with metadata indicating, for a patch of the atlas, whether the patch is a first or a second patch; and encoding said atlas in said data stream.

The present principles also relate to a method for decoding data representative of a 3D scene from a data stream. The method comprises:

decoding the data stream to retrieve an atlas and associated metadata. The atlas is an image packing patches according to an atlas layout. A patch is a part of one view of a MVD content acquired from a region of the 3D scene. The metadata comprises, for a patch of the atlas, data indicating whether the patch is a first or a second patch; a first patch is a part of a MVD content acquired from a first region of the 3D scene and a second patch is a part of a MVD acquired from a second region of the 3D scene. First and second region may overlap or being separated.

rendering a viewport image from a point of view within the 3D scene by using patches indicated as first patches in the metadata; and using patches indicated as second patches in the metadata for pre-processing and/or post-processing said viewport image.

The present principles also relate to a device comprising a processor configured for implementing the encoding method above and to a device comprising a processor configured for implementing the decoding method above.

The present principles also relate to a data stream and/or to a non-transitory medium carrying data representative of a 3D scene. The data stream or the non-transitory medium comprises:

an atlas image packing first and second patches according to an atlas layout, a first patch being a part of one view of a MVD content acquired for a rendering of the 3D scene, a second patch being a part of one view of a MVD content acquired for a pre-processing or a post-processing use, and metadata associated with said atlas, the metadata comprising, for a patch of the atlas, data indicating whether the patch is a first or a second patch.

BRIEF DESCRIPTION OF DRAWINGS

The present disclosure will be better understood, and other specific features and advantages will emerge upon reading the following description, the description making reference to the annexed drawings wherein.

DETAILED DESCRIPTION OF EMBODIMENTS

Figure 1:
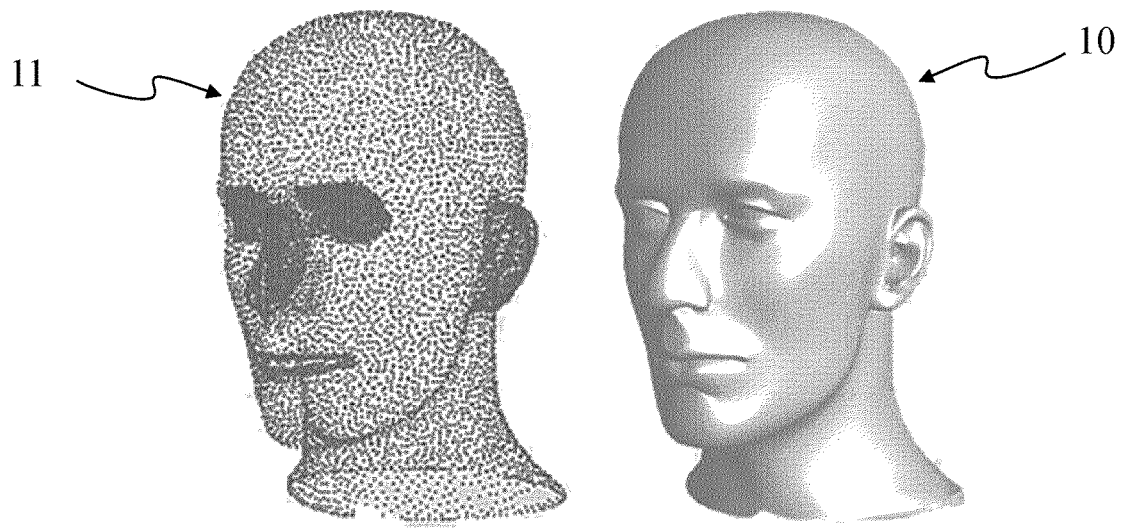
FIG. 1 shows a three-dimension (3D) model of an object and points of a point cloud corresponding to the 3D model, according to a non-limiting embodiment of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

FIG. 1 shows a three-dimension (3D) model 10 of an object and points of a point cloud 11 corresponding to 3D model 10. 3D model 10 and the point cloud 11 may for example correspond to a possible 3D representation of an object of the 3D scene comprising other objects. Model 10 may be a 3D mesh representation and points of point cloud 11 may be the vertices of the mesh. Points of point cloud 11 may also be points spread on the surface of faces of the mesh. Model 10 may also be represented as a splatted version of point cloud 11, the surface of model 10 being created by splatting the points of the point cloud 11. Model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.:

- from a capture of a real object shot by a rig of cameras, optionally complemented by depth active sensing device;
- from a capture of a virtual/synthetic object shot by a rig of virtual cameras in a modelling tool;
- from a mix of both real and virtual objects.

Figure 2:
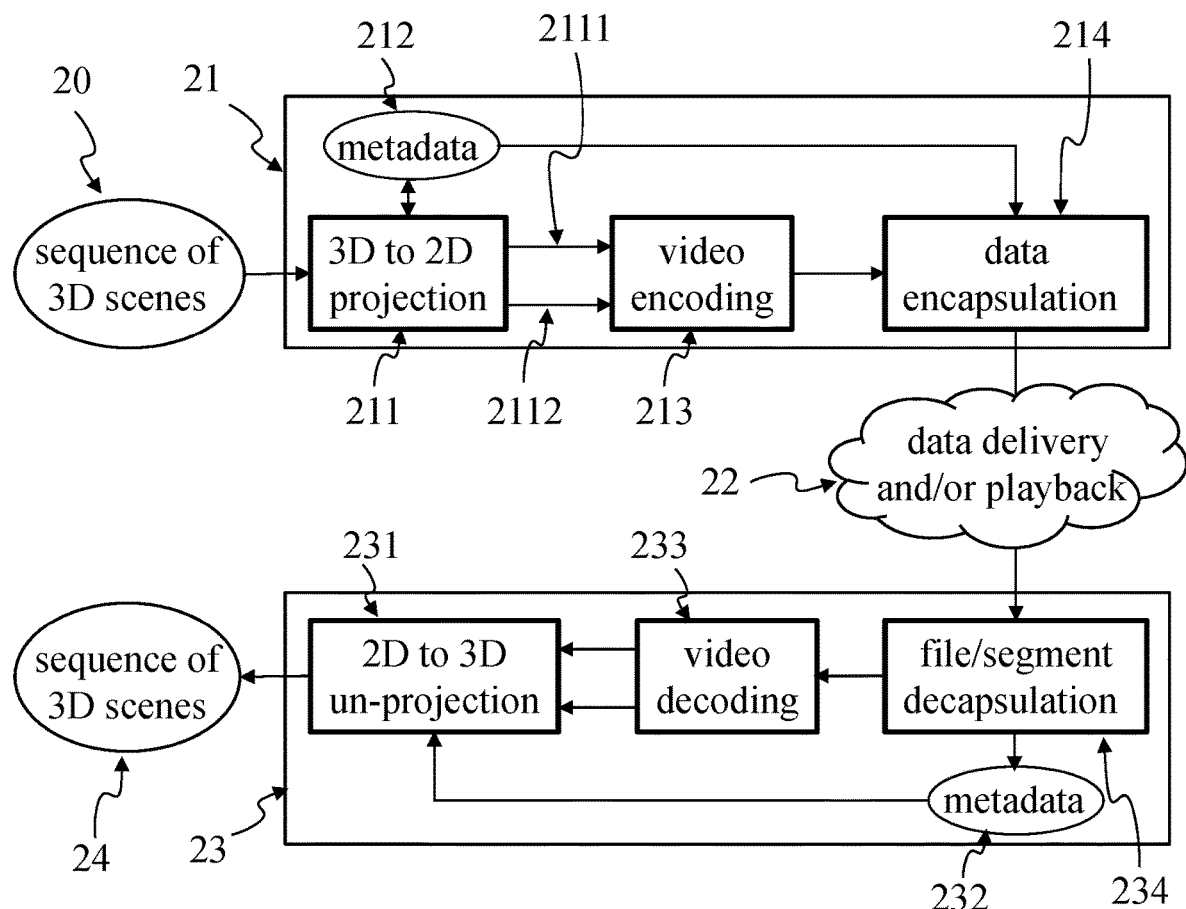
FIG. 2 shows a non-limitative example of the encoding, transmission and decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes may be provided to a volumetric video rendering device for a 3DoF, 3Dof+ or 6DoF rendering and displaying.

Sequence of 3D scenes 20 is provided to an encoder 21. The encoder 21 takes one 3D scenes or a sequence of 3D scenes as input and provides a bit stream representative of the input. The bit stream may be stored in a memory 22 and/or on an electronic data medium and may be transmitted over a network 22. The bit stream representative of a sequence of 3D scenes may be read from a memory 22 and/or received from a network 22 by a decoder 23. Decoder 23 is inputted by said bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence 20. Frame 2111 comprises color information and depth information representative of the 3D scene projected onto frame 2111. In a variant, color information and depth information are encoded in two separate frames 2111 and 2112.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7.

A video encoding circuit 213 encodes sequence of frames 2111 and 2112 as a video. Pictures of a 3D scene 2111 and 2112 (or a sequence of pictures of the 3D scene) is encoded in a stream by video encoder 213. Then video data and metadata 212 are encapsulated in a data stream by a data encapsulation circuit 214.

Encoder 213 is for example compliant with an encoder such as:
- JPEG, specification ISO/CEI 10918-1 UIT-T Recommendation T.81, https://www.itu.int/rec/T-REC-T.81/en;
- AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-I/en);
- 3D-HEVC (an extension of HEVC whose specification is found at the ITU website, T recommendation, H series, h265, http://www.itu.int/rec/T-REC-H.265-201612I/en annex G and I);
- VP9 developed by Google; or
- AV1 (AOMedia Video 1) developed by Alliance for Open Media.

The data stream is stored in a memory that is accessible, for example through a network 22, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD). Decoder 23 obtains the stream from a source 22. For example, source 22 belongs to a set comprising:

a local memory, e.g. a video memory or a RAM (or Random-Access Memory), a flash memory, a ROM (or Read Only Memory), a hard disk;

a storage interface, e.g. an interface with a mass storage, a RAM, a flash memory, a ROM, an optical disc or a magnetic support;

a communication interface, e.g. a wireline interface (for example a bus interface, a wide area network interface, a local area network interface) or a wireless interface (such as a IEEE 802.11 interface or a Bluetooth® interface); and a user interface such as a Graphical User Interface enabling a user to input data.

Decoder 23 comprises a circuit 234 for extract data encoded in the data stream. Circuit 234 takes a data stream as input and provides metadata 232 corresponding to metadata 212 encoded in the stream and a two-dimensional video. The video is decoded by a video decoder 233 which provides a sequence of frames. Decoded frames comprise color and depth information. In a variant, video decoder 233 provides two sequences of frames, one comprising color information, the other comprising depth information. A circuit 231 uses metadata 232 to un-project color and depth information from decoded frames to provide a sequence of 3D scenes 24. Sequence of 3D scenes 24 corresponds to sequence of 3D scenes 20, with a possible loss of precision related to the encoding as a 2D video and to the video compression.

Other circuits and functionalities may be added, for instance before the un-projection step by circuit 231 or in a post-processing step after the un-projection. For instance, circuits may be added for relighting of the scene from another light located anywhere in the scene. Collision detection may be performed for depth compositing, like adding a new object into the 3DoF+ scene in a consistent realistic way or for path planning. Such circuit may require geometry and/or color information about the 3D scene that is not to be used for the 3DoF+ rendering itself. The semantics of the different kinds of information has to be indicated the bitstream representative of the 3DoF+ scene.

Figure 3:
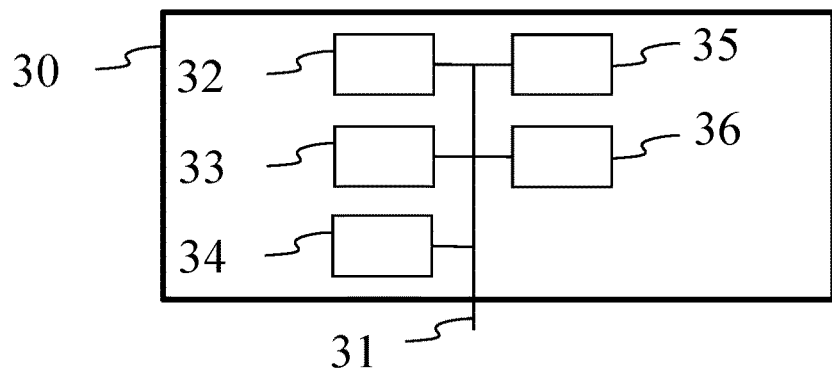
FIG. 3 shows an example architecture of a device which may be configured to implement a method described in relation with FIGS. 8 and 9, according to a non-limiting embodiment of the present principles.
Figure 8:
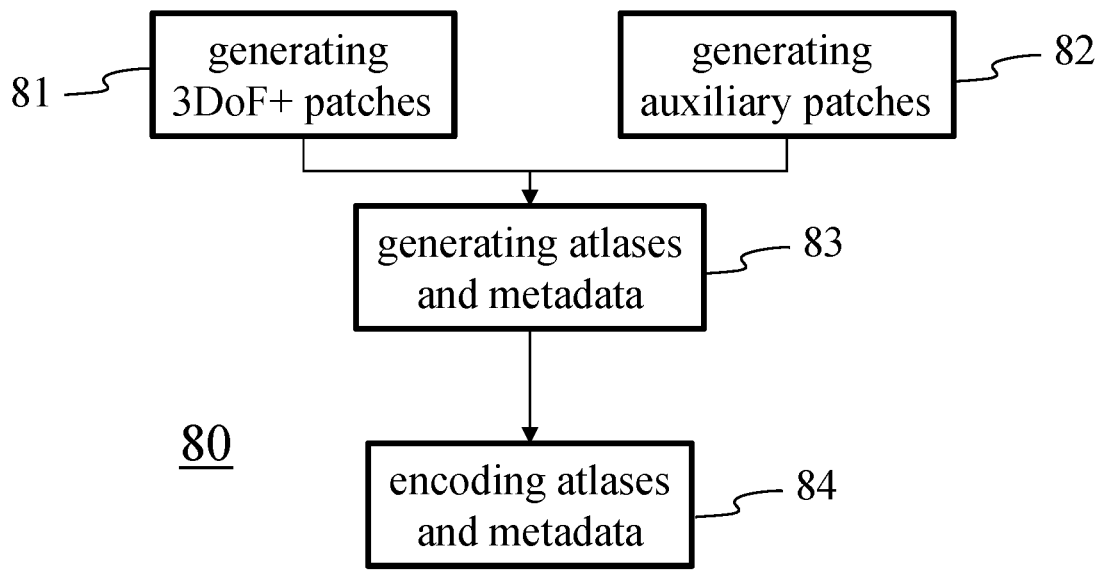
FIG. 8 illustrates a method 80 for encoding a volumetric video content comprising auxiliary information, according to a non-limiting embodiment of the present principles.
Figure 9:
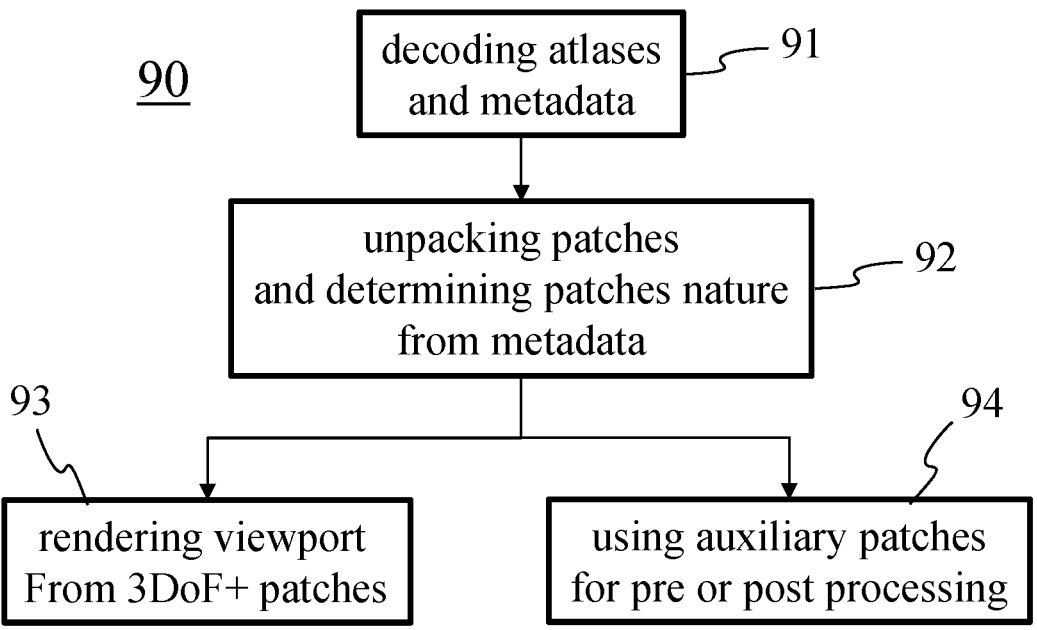
FIG. 9 illustrates a method 90 for decoding a volumetric video content comprising auxiliary information, according to a non-limiting embodiment of the present principles.

FIG. 3 shows an example architecture of a device 30 which may be configured to implement a method described in relation with FIGS. 8 and 9. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:

a microprocessor 32 (or CPU), which is, for example, a DSP (or Digital Signal Processor);

a ROM (or Read Only Memory) 33;

a RAM (or Random Access Memory) 34;

a storage interface 35;

an I/O interface 36 for reception of data to transmit, from an application; and a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with FIGS. 8 and 9, and belongs to a set comprising:

a mobile device;

a communication device;

a game device;

a tablet (or tablet computer);

a laptop;

a still picture camera;

a video camera;

an encoding chip;

a server (e.g. a broadcast server, a video-on-demand server or a web server).

Figure 4:
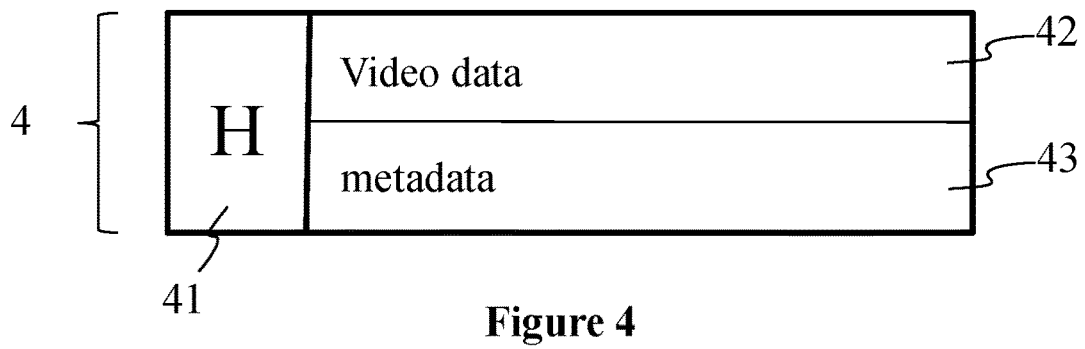
FIG. 4 shows an example of an embodiment of the syntax of a stream when the data are transmitted over a packet-based transmission protocol, according to a non-limiting embodiment of the present principles.

FIG. 4 shows an example of an embodiment of the syntax of a stream when the data are transmitted over a packet-based transmission protocol. FIG. 4 shows an example structure 4 of a volumetric video stream. The structure consists in a container which organizes the stream in independent elements of syntax. The structure may comprise a header part 41 which is a set of data common to every syntax elements of the stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112. The structure comprises a payload comprising an element of syntax 42 and at least one element of syntax 43. Syntax element 42 comprises data representative of the color and depth frames. Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards).

Figure 5:
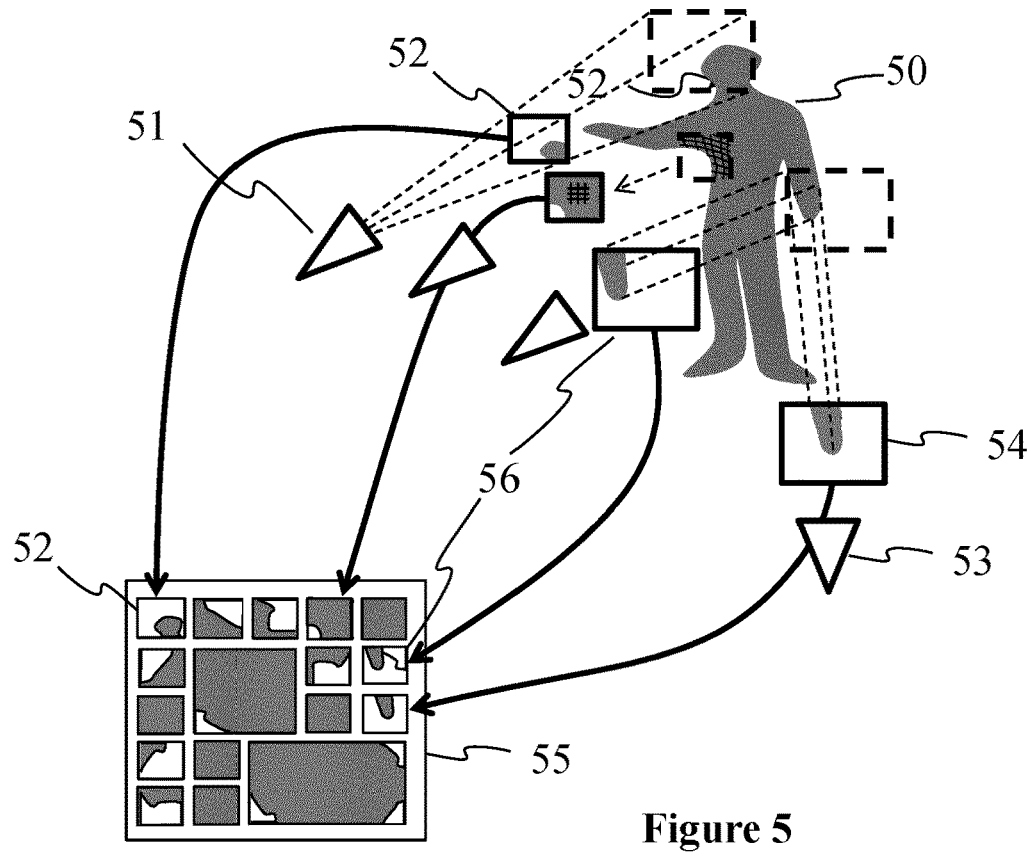
FIG. 5 illustrates a spherical projection from a central point of view, according to a non-limiting embodiment of the present principles.

FIG. 5 illustrates the patch atlas approach with an example of 4 projection centers. 3D scene 50 comprises a character. For instance, center of projection 51 is a perspective camera and camera 53 is an orthographic camera.

Cameras may also be omnidirectional cameras with, for instance a spherical mapping (e.g. Equi-Rectangular mapping) or a cube mapping. The 3D points of the 3D scene are projected onto the 2D planes associated with virtual cameras located at the projection centers, according to a projection operation described in projection data of metadata. In the example of FIG. 5, projection of the points captured by camera 51 is mapped onto patch 52 according to a perspective mapping and projection of the points captured by camera 53 is mapped onto patch 54 according to an orthographic mapping.

The clustering of the projected pixels yields a multiplicity of 2D patches, which are packed in a rectangular atlas 55. The organization of patches within the atlas defines the atlas layout. In an embodiment, two atlases with identical layout: one for texture (i.e. color) information and one for depth information. Two patches captured by a same camera or by two distinct cameras may comprise information representative of a same part of the 3D scene, like, for instance patches 54 and 56.

The packing operation produces a patch data for each generated patch. A patch data comprises a reference to a projection data (e.g. an index in a table of projection data or a pointer (i.e. address in memory or in a data stream) to a projection data) and information describing the location and the size of the patch within the atlas (e.g. top left corner coordinates, size and width in pixels). Patch data items are added to metadata to be encapsulated in the data stream in association with the compressed data of the one or two atlases.

Figure 6:
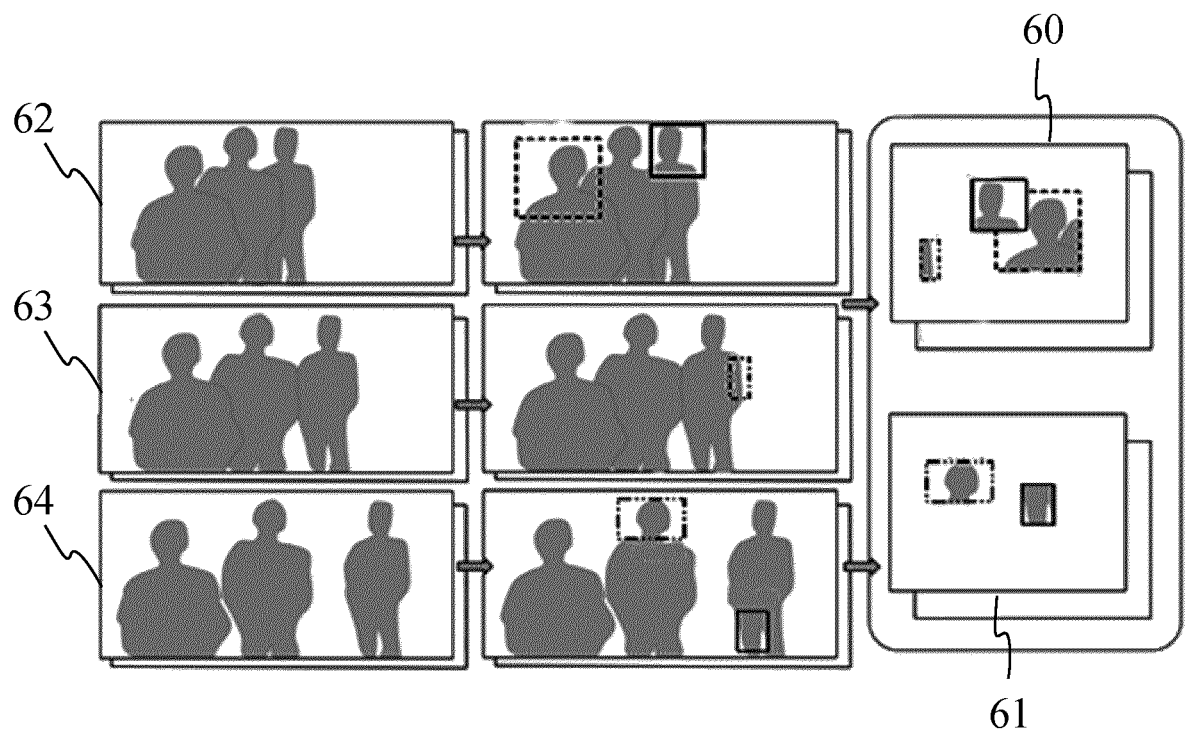
FIG. 6 shows an example of generation of atlases 60 and 61 by an encoder, according to a non-limiting embodiment of the present principles

FIG. 6 shows an example of generation of atlases 60 and 61 by an encoder. Atlases 60 and 61 comprise the texture information (e.g. RGB data or YUV data) of the points of a 3D scene, according to a non-limiting embodiment of the present principles. As explained in relation to FIG. 5, an atlas is an image packing patches. For instance, the encoder takes as input a multiview+depth video comprising three views 62, 63 and 64 in the example of FIG. 6. The encoder removes inter-views redundancy (pruning step) and packs the selected patches of texture and depth into one or more atlases. The bitstream therefore consists of multiple video streams (e.g. HEVC video streams) carrying the atlases of texture and depth patches, accompanied by metadata describing the camera parameters of input views and the atlases layouts.

The patch atlases consist of pairs of texture and depth atlas components, with same picture size and same layout (same packing) for texture and depth. In an approach, atlases carry only information needed for the 3DoF+ rendering of the scene from any point within a viewing bounding box. In another approach, atlases may carry addition geometry and/or color information useful for other processing like scene relighting or collision detection. For instance, this additional information may be geometry of the back of the objects of the 3D scene. Such patches are called auxiliary patches. They are not meant to be rendered by the decoder but used by pre-processing or post-processing circuit of the decoder.

Figure 7:
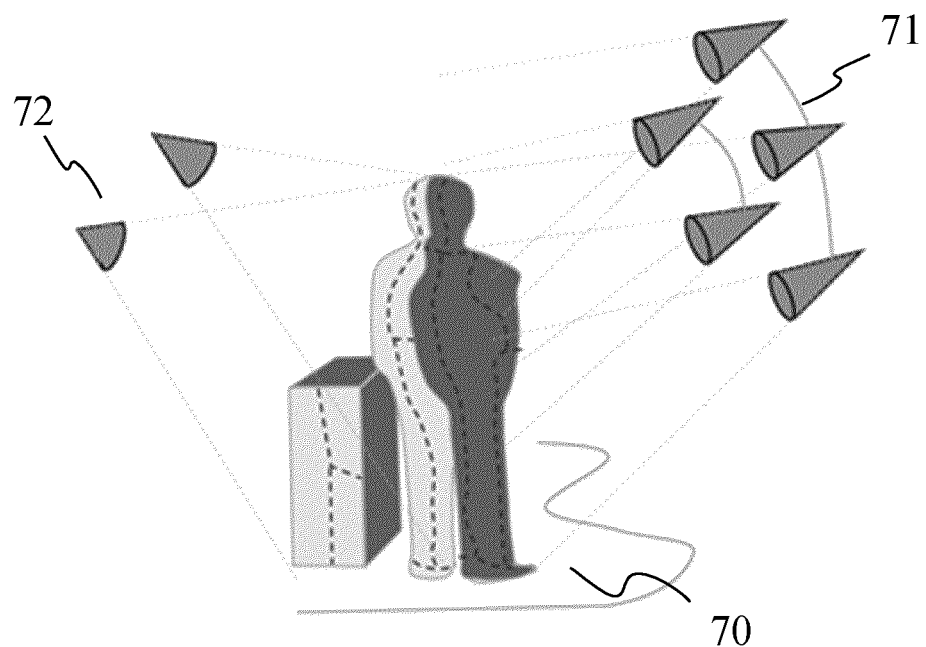
FIG. 7 illustrates the acquisition of views for a 3DoF+ rendering plus additional views for auxiliary patches, according to a non-limiting embodiment of the present principles

FIG. 7 illustrates the acquisition of views for a 3DoF+ rendering plus additional views for auxiliary patches. At the encoder side generation of auxiliary patches may be performed by different means. For instance, for the acquisition of a scene 70, a first group 71 of real or virtual cameras may be placed, pointing the front of the scene 70. A second group 72 of real or virtual cameras is placed to look at the back and sides of the volumetric scene. In an embodiment, cameras 72 capture views in lower resolution than cameras 71. Cameras 72 get the geometry and/or the color of the hidden part of objects. Patches obtained from views captured by cameras 71 are patches for a 3DoF+ rendering, while patches obtained from views captured by cameras 72 are auxiliary patches to complete the description of the geometry and/or color information for a pre-processing or a post-processing use. Metadata associated with patches of an atlas may be formatted to signal the semantics of each patch. At the decoder side, the viewport renderer has to skip the patches invalid for rendering. The metadata also indicates what module(s) of the decoder may use these rendering-invalid patches. For instance, a re-lighter circuit would use this auxiliary information to update its geometry map from the point of view of the light and to change the enlighten texture of the whole scene accordingly to generate the appropriate shadows.

Means to generate auxiliary patches, associated with cameras 72 shooting from the back and the sides, that describe the geometry of the back parts of objects, typically at lower resolution, are added to the encoder. Additional depth views from back and side have first to be obtained, which can be done in various ways. In case of synthetically generated objects, depth images associated with virtual cameras placed anywhere are directly obtained from the 3D model. For natural 3D captures, additional color and/or active depth cameras could be added at shooting stage: depth cameras directly provide depth views, whereas photogrammetry algorithm estimate depth from color views. When neither 3D model nor additional capture is available, convex shape completion algorithms can be used to generate plausible closed shapes from the open form geometry recovered from the front cameras. Then, inter-view redundancy is removed by pruning, in a similar way as performed on views from cameras 71. In an embodiment, pruning is performed independently on the two groups of views. So, possible redundancy between regular and extra patches is not removed. The resulting Auxiliary depth patches are packed together with regular patches within the depth patch atlas(es).

In another embodiment, if the auxiliary patches are defined for depth only, the texture part on the atlas would remain empty if an identical layout is used for texture and depth atlases. Even if these auxiliary patches are supposed to be defined in lower resolution, this would result into a loss of room in the texture atlas. In such an embodiment, different layouts may be used for depth and texture atlases, this difference being indicated in the metadata associated with the atlases.

A possible syntax for metadata describing atlases may comprise a high level notion, called 'entity_id': this entity_id allows to attach group of patches to an index for high level semantic processing such as object filtering or compositing. A possible syntax a for atlas parameters metadata is shown in the following table.

| | Descriptor |
|---|---|
| atlas_params( a ) { | |
|    num_patches_minus1[ a ] | u(16) |
|    atlas_width_minus1[ a ] | u(16) |
|    atlas_height_minus1[ a ] | u(16) |
|    depth_occ_params_present_flag[ a ] | u(1) |
|    for( p = 0; p <= num_patches_minus1; p++ ) { | |
|       view_id[ a ][ p ] | u(v) |
|       if( max_entities_minus1 > 0 ) | |
|          entity_id[ a ][ p ] | u(v) |
|       patch_width_in_view[ a ][ p ] | u(v) |
|       patch_height_in_view[ a ][ p ] | u(v) |

-continued

| | Descriptor |
|---|---|
| patch_pos_in_atlas_x[ a ][ p ] | u(v) |
| patch_pos_in_atlas_y[ a ][ p ] | u(v) |
| patch_pos_in_view_x[ a ][ p ] | u(v) |
| patch_pos_in_view_y[ a ][ p ] | u(v) |
| patch_rotation[ a ][ p ] | u(3) |
|     if( depth_occ_params_present_flag[ a ] ) | |
|         depth_occupancy( a, p ) | |
|   } | |
| } | |

According to an embodiment of the present principles, auxiliary patches are identified as particular entities, called auxiliary entities. Then, the number of entities and their function (i.e. whether they are auxiliary entities) are described in metadata as shown in the following table:

| | Descriptor |
|---|---|
| iv_sequence_params( ) { | |
|   ivs_profile_tier_level( ) | |
|   depth_params_num_bits_minus8 | u(4) |
|   view_params_list( ) | |
|   depth_low_quality_flag | u(1) |
|   num_groups_minus1 | ue(v) |
|   max_entities_minus1 | ue(v) |
|   auxiliary_flag | u(1) |
|   if ( auxiliary_flag and max_entities_minus1 != 0) { | |
|     for (e==0; e <= max_entities_minus1; e ++) { | |
|       auxiliary_entity_flag [ e ] | u(1) |
|     } | |
|   viewing_space_present_flag | u(1) |
|   if(viewing_space_present_flag) | |
|     viewing_space( ) | |
|   ivs_sp_extension_present_flag | u(1) |
|   if( ivs_sp_extension_present_flag ) { | |
|     while( more_data_in_payload( ) ) | |
|       ivs_sp_extension_data_flag | u(1) |
|   rbsp_trailing_bits( ) | |
| } | | auxiliary_flag equal to 1 indicates that the auxiliary description is present for each entity structure.

auxiliary_entity_flag[e] equal to 1 indicates that the patches related to the entity e are not for the viewport rendering.

According to another embodiment of the present principles, the auxiliary patches are signalled at patch level by modifying the atlas parameters syntax as shown in the following table:

| | Descriptor |
|---|---|
| atlas_params( a ) { | |
|   num_patches_minus1[ a ] | u(16) |
|   atlas_width_minus1[ a ] | u(16) |
|   atlas_height_minus1[ a ] | u(16) |
|   depth_occ_params_present_flag[ a ] | u(1) |
|   auxiliary_flag[ a ] | u(1) |
|   for( p = 0; p <= num_patches_minus1; p++ ) { | |
|     view_id[ a ][ p ] | u(v) |
|     if( max_entities_minus1 > 0 ) | |
|       entity_id[ a ][ p ] | u(v) |
|     if( auxiliary_flag[ a ] ) | |
|       auxiliary_patch_flag[ a ][ p ] | u(1) |
|     patch_width_in_view[ a ][ p ] | u(v) |
|     patch_height_in_view[ a ][ p ] | u(v) |
|     patch_pos_in_atlas_x[ a ][ p ] | u(v) |
|     patch_pos_in_atlas_y[ a ][ p ] | u(v) |
|     patch_pos_in_view_x[ a ][ p ] | u(v) |
|     patch_pos_in_view_y[ a ][ p ] | u(v) |
|     patch_rotation[ a ][ p ] | u(3) |
|     if( depth_occ_params_present_flag[ a ] ) | |
|       depth_occupancy( a, p ) | |
|   } | |
| } | | auxiliary_flag equal to 1 indicates that the auxiliary description is present for each patch structure.

auxiliary_patch_flag [a][p] equal to 1 indicates that the patch p of the atlas a is not for the viewport rendering.

In another embodiment, the patch information data syntax defines auxiliary patch flag as shown in the following table:

| | Descriptor |
|---|---|
| patch_information_data (patchIndex, patch_mode ) ( ) { | |
|   auxiliary_patch_flag | u(1) |
|   if(patch_mode = = P_SKIP ) | |
|     skip_patch_data_unit( patchIndex ) | |
|   else if(patch_mode = = P_MERGE ) | |
|     merge_patch_data_unit( patchIndex ) | |
|   else if(patch_mode = = I_INTRA || patch_mode = = P_INTRA) | |
|     patch_data_unit( patchIndex ) | |
|   else if( patch_mode = = P_INTER) | |
|     inter_patch_data_unit( patchIndex ) | |
|   else if(patch_mode = = I_RAW || patch_mode = = P_RAW ) | |
|     raw_patch_data_unit( patchIndex ) | |
| } | |

At the decoding side, the auxiliary_patch_flag is used to determine whether a patch comprises information for the rendering and/or for another module.

FIG. 8 illustrates a method 80 for encoding a volumetric video content comprising auxiliary information, according to a non-limiting embodiment of the present principles. In a step 81, patches meant to be used for a 3DoF+ rendering are generated, for example, by pruning redundant information from a Multiview-plus-depth content acquired by a first group of cameras. In a step 82, auxiliary patches are generated from views captured by cameras shooting parts of the scene which are not meant to be rendered. Steps 81 and 82 may be executed in parallel or one after the other. Views used for generating auxiliary patches are captured by a second group of cameras, for example, located at the back and the side of the 3D scene. Auxiliary patches are generated, for instance, by pruning redundant information comprised in the views captured by cameras of the first and the second group. In another embodiment, auxiliary patches are generated, for instance, by pruning redundant information comprised in the views captured by cameras of the second group only. In this embodiment, redundancy may exist between 3DoF+ patches and auxiliary patches. In a step 83, atlases are generated by packing 3DoF+ and auxiliary patches in a same image. In an embodiment, the packing layout is different for the depth and the color components of an atlas. Metadata describing atlases parameters and patch parameters are generated according to a syntax as described in tables above. Metadata comprise information indicating, for each patch, whether the patch is a 3DoF+ patch, meant to be rendered, or an auxiliary patch, meant to be used for pre-processing and/or post-processing. In a step 84, generated atlases and associated metadata are encoded in a data stream.

FIG. 9 illustrates a method 90 for decoding a volumetric video content comprising auxiliary information, according to a non-limiting embodiment of the present principles. In a step 91 a data stream representative of a volumetric content is obtained from a stream. The data stream is decoded to retrieve atlases and associated metadata. An atlas is an image packing at least one patch according to a packing layout. A patch is a picture comprising depth and/or color information representative of a part of the 3D scene. Metadata comprise information for de-projecting a patch and retrieving the 3D scene. In a step 92, patches are unpacked from the atlases and a nature is attributed to each patch according to information comprised in the metadata. A patch may be a 3DoF+ patch, meant to be used for rendering a viewport image at a step 93, or an auxiliary patch, meant to be used for a pre-processing or a post-processing operation at a step 94. Steps 93 and 94 may be executed in parallel or one after the other.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding a 3D scene in a data stream, the method comprising:
generating a set of first patches from a first multi-view-plus-depth (MVD) content acquired for a rendering of the 3D scene, a first patch being a part of one of the views of the first MVD content;
generating a set of second patches from a second MVD content, wherein the second patches are not intended to be used for view rendering and being acquired for a pre-processing or a post-processing of the rendering of the 3D scene use, a second patch being a part of one of the views of the second MVD content;
generating a first atlas packing said first patches and a second atlas packing said second patches, an atlas being an image packing patches according to an atlas layout; and
encoding said first and second atlases in said data stream.

2. The method of claim 1, wherein the second MVD content is acquired in a resolution lower than a resolution of the first MVD content.

3. The method of claim 1, wherein a patch is a part of one view of a MVD content obtained by removing information redundancy between views of the MVD content.

4. The method of claim 1, wherein said first and second patches are packed in a common atlas, the common atlas being associated with metadata indicating, for each patch whether the patch is the first patch or the second patch.

5. The method of claim 1, wherein the second atlas associated with metadata indicating that the second patches are not intended to be used for view rendering and comprising a list of types of pre-processing or a post-processing of the rendering of the 3D scene.

6. The method of claim 5, wherein a type of pre-processing or a post-processing of the rendering of the 3D scene belongs to a group of types of pre-processing or a post-processing of the rendering of the 3D scene comprising collision detection, interactions, and scene relighting.

7. A method for decoding a 3D scene from a data stream, the method comprising:
  decoding said data stream to retrieve a first atlas and a second atlas, wherein the first atlas and the second atlas are images packing first or second patches respectively according to an atlas layout, a first patch being a part of one view of a first MVD content acquired for a rendering of the 3D scene, a second patch being a part of one view of a second MVD content, being not intended to be used for view rendering and being acquired for a pre-processing or a post-processing of the rendering of the 3D scene;
  using second patches for a pre-processing and/or a post-processing of the rendering of the 3D scene; and
  rendering a viewport image from a point of view within the 3D scene by using first patches.

8. The method of claim 7, wherein the second MVD content has a resolution lower than a resolution of the first MVD content.

9. The method of claim 7, wherein the first atlas and the second atlas are a unique atlas, the unique atlas being associated with metadata indicating, for each patch whether the patch is the first patch or the second patch.

10. The method of claim 7, wherein the second atlas associated with metadata indicating that the second patches are not intended to be used for view rendering and comprising a list of types of pre-processing or a post-processing of the rendering of the 3D scene.

11. The method of claim 10, wherein a type of pre-processing or a post-processing of the rendering of the 3D scene belongs to a group of types of pre-processing or a post-processing of the rendering of the 3D scene comprising collision detection, interactions, and scene relighting.

12. A device for encoding a 3D scene in a data stream, the device comprising a memory associated with a processor configured for:
  generating a set of first patches from a first multi-view-plus-depth (MVD) content acquired for a rendering of the 3D scene, a first patch being a part of one of the views of the first MVD content;
  generating a set of second patches from a second MVD content, wherein the second patches are not intended to be used for view rendering and being acquired for a pre-processing or a post-processing of the rendering of the 3D scene, a second patch being a part of one of the views of the second MVD content;
  generating a first atlas packing said first patches and a second atlas packing said second patches, an atlas being an image packing patches according to an atlas layout; and
  encoding said first and second atlases in said data stream.

13. The device of claim 12, wherein the second MVD content is acquired in a resolution lower than a resolution of the first MVD content.

14. The device of claim 12, wherein a patch is a part of one view of a MVD content obtained by removing information redundancy between views of the MVD content.

15. The device of claim 12, wherein said first and second patches are packed in a unique atlas, the unique atlas being associated with metadata indicating, for each patch whether the patch is the first patch or the second patch.

16. The device of claim 12, wherein the second atlas associated with metadata indicating that the second patches are not intended to be used for view rendering and comprising a list of types of pre-processing or a post-processing of the rendering of the 3D scene.

17. The device of claim 16, wherein a type of pre-processing or a post-processing of the rendering of the 3D scene belongs to a group of types of pre-processing or a post-processing of the rendering of the 3D scene comprising collision detection, interactions, and scene relighting.

18. A device for decoding a 3D scene from a data stream, the device comprising a processor configured for:
  decoding said data stream to retrieve a first atlas and a second atlas, wherein the first atlas and the second atlas are images packing first or second patches respectively according to an atlas layout, a first patch being a part of one view of a first MVD content acquired for a rendering of the 3D scene, a second patch being a part of one view of a second MVD content, being not intended to be used for view rendering and being acquired for a pre-processing or a post-processing of the rendering of the 3D scene use;
  using second patches for a pre-processing and/or a post-processing of the rendering of the 3D scene; and
  rendering a viewport image from a point of view within the 3D scene by using first patches.

19. The device of claim 18, wherein the second MVD content has a resolution lower than a resolution of the first MVD content.

20. The device of claim 18, wherein the first atlas and the second atlas are a unique atlas, the unique atlas being associated with metadata indicating, for each patch whether the patch is the first patch or the second patch.

21. The device of claim 18, wherein the second atlas associated with metadata indicating that the second patches are not intended to be used for view rendering and comprising a list of types of pre-processing or a post-processing of the rendering of the 3D scene.

22. The device of claim 21, wherein a type of pre-processing or a post-processing of the rendering of the 3D scene belongs to a group of types of pre-processing or a post-processing of the rendering of the 3D scene comprising collision detection, interactions, and scene relighting.

* * * * *